Dec. 22, 1936.　　　　W. E. HOKE　　　　2,065,311

ROLLER BEARING

Filed Nov. 13, 1934

Inventor
W. E. HOKE
By Thos W. J. Clark
Attorney

Patented Dec. 22, 1936

2,065,311

UNITED STATES PATENT OFFICE 2,065,311

ROLLER BEARING

William E. Hoke, Baltimore, Md.

Application November 13, 1934, Serial No. 752,812

12 Claims. (Cl. 308—214)

My invention relates to an improved roller bearing which may be used for a thrust bearing or a radial load bearing, or a combination of the two in any needed or desired relation of the directions of the application of the load. Among the objects of my invention are to make a self-contained, preloaded, double-acting bearing that may be initially accurately constructed, adjusted and locked in permanent adjustment and which will wear accurately and evenly, and one in which the wear may be taken up; another object is to make a bearing in which the rollers will be held in their operative relation with or without a cage; another object is to make a bearing in which by small adaptation of the bearing, varying loads may be carried and varying relations between the directions of application of the load may be provided for; other objects and advantages of my invention will be apparent from the following description and the accompanying drawing forming a part hereof and in which:

In the drawing similar numerals refer to similar parts throughout the several views.

Figure 1:
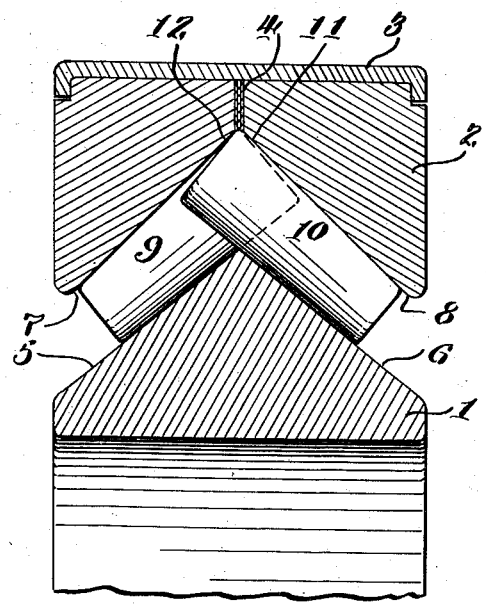
Figure 1 is a cross sectional elevation of a bearing showing one modification of my invention.

I have shown relatively rotatable inner members 1 and outer members 2. The outer member may be made of two parts joined together in any desired manner, as by the sleeve 3. Shims 4 may be placed between the two parts to get absolutely accurate adjustment of the width of the race ways, and these shims may be removed and the parts drawn together when the race ways and rollers wear.

In each of the views I have shown symmetrical conical race ways, the inner ones, 5 and 6 being angularly disposed to the outer ones 7 and 8. Sets of conical rollers 9 and 10 are placed between the opposed pairs of race ways 5 and 7, and 6 and 8, respectively. The projection of any straight line lying in the surface of the conical rollers of either set and another in the surface of the respective race ways would meet in a common point in the axis of rotation of whichever member, the inner one, 1 or the outer one, 2, rotates with respect to the other. Such a line is often referred to as the line of generation of the respective conical surface, and the common point as the apex.

Figure 3:
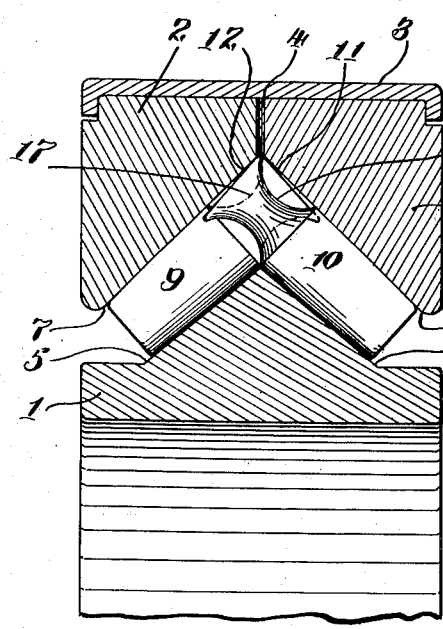
Fig. 3 is a similar view showing a hyperbolic head for the rollers.

As shown in Fig. 1 the rollers 9 and 10 have substantially flat heads, and across the top, the heads are circular. The race ways 7 and 8 are conical and any plane at right angles to the axis of rotation of the respective members would cut a circle in said conical surface and a line between any two points in the circumference of such circle would form a chord. The angles between race ways 7 and 8 in Figs. 1 and 3 are such that the heads of the rollers 9 will have a chord in common with a chord formed in a right plane, as above outlined, in the conical surface 8, and the heads of the rollers 10 with the surface 7. These chords will be at approximately 11 and 12 respectively. The nearer the axes of the respective sets of rollers are to forming a right angle to each other, the nearer will this chord on the top of the rollers approach a diameter of the top of the rollers. The rollers are in contact with the opposite race way at the extremities of this common chord, and so the rollers have two or more points of contact with the opposite race way, and they will consequently always maintain their alignment with their own race way. Should the heads of the rollers be slightly rounded, they may have a line or surface contact with the opposite race way, but the contact should always be at least a two point contact to maintain the desired stability of the rollers in the race ways.

Also as shown in each of the figures, the rollers contact with each other to maintain their spacing. This point of contact is removed from the head of the rollers a distance substantially equal to the radius of the head of the roller. This gives a sliding contact, the rotational frictional force of which is directed lengthwise of the roller, and not in a direction to retard the rotation of adjacent rollers.

It will however be understood that several rollers may be adjacent each other in one set and only interfingered by other rollers in the other set between every second or third roller. This type of mounting will be desired where the thrust may be considerably greater on one side of the complete bearing than on the other side.

Figure 2:
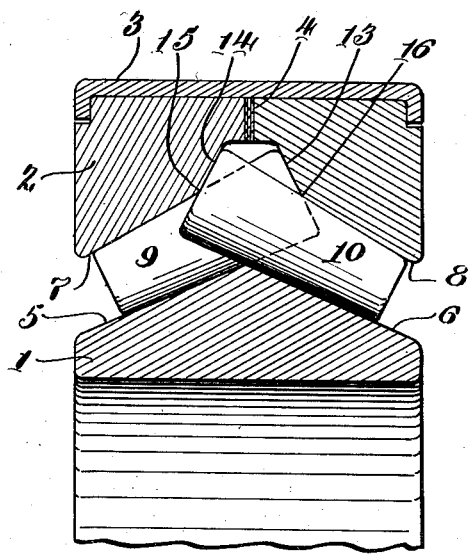
Fig. 2 is a similar view showing slightly different outer races.

In Fig. 2 I have shown a modification of the bearing shown in Fig. 1 in which the outer conical race ways are cut away at their largest diameters, to form shoulders for contacting the heads of the opposite set of rollers. The shoulder 13 forms a bearing surface for rollers 9 and shoulder 14 forms a bearing surface for rollers 10. There is still a common chord between the outer conical race way and the top of the rollers, as shown at 16 and 15, and this chord is nearly a diameter of the top of the rollers. Relatively slight angular changes of shoulders 13 and 14 move the location of the common chord to any desired position across the heads of rollers 9 and 10. In Fig. 2 the rollers also space themselves by sliding contacts with each other.

In Fig. 3 I have shown a hyperbolic construction for the heads of the rollers, 17 on rollers 9 and 18, on rollers 10, and these sections interfinger and interlock, tending to greater stability. The amount the hyperbolic construction approaches the axis of the rollers may be varied, if it is one-fourth the roller diameter on each side, nearly twice as many rollers may be used in each set as are used in a construction such as Figs. 1 and 2. In this construction there may also be a common chord between the heads of the rollers and their respective outer race ways, as indicated at 11 and 12 in Fig. 3. With a hyperbolic head construction of the rollers, they contact on a line or surface between adjacent rollers of the opposite sets, whereas, in the construction as shown in Figs. 1 and 2, the contact is a point contact, tending to wear, however, to a hyperbolic head and a line or surface contact.

Figure 4:
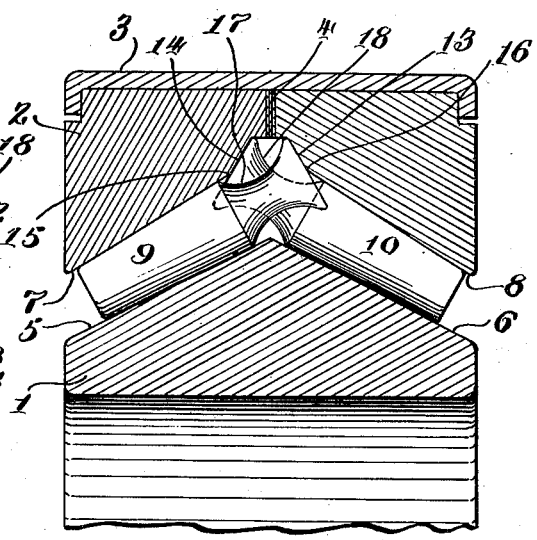
Fig. 4 is a similar view showing the same rollers as in Fig. 3 and outer races like those of Fig. 2.

In Fig. 4 I have shown the use of shoulders on the outer race ways, as in Fig. 2, combined with the hyperbolic head for the rollers as in Fig. 3.

It will be apparent that no cage is required to maintain accurate alignment of the rollers but cages may be used if desired. In the constructions shown, a full complement of rollers are usually assembled by the use of an outer member made of two parts; where less than a full complement are required, they may be assembled with a solid outer and inner member.

The angles of the outer race ways may be varied somewhat, and they need not always be symmetrical with the axis of rotation of the rotatable member, the direction of application of load, and other factors determining the exact design required.

While I have shown various modifications for the purpose of illustration, it will be apparent to those skilled in the art that many changes are possible within the scope of invention.

I claim:

1. A roller bearing comprising inner and outer relatively rotatable members each having two conical race ways therein, those on one member being opposed to those on the other member, conical rollers between said opposed race ways, the larger end of the rollers of each set extending axially beyond their respective inner race ways into the path of movement of the other set and the heads of each set of rollers contacting with the outer race way of the other set at two points equally and substantially removed from the outermost point of each roller.

2. A roller bearing comprising inner and outer relatively rotatable members each having two conical race ways therein, those on one member being opposed to those on the other member, conical rollers between said opposed race ways, the larger end of the rollers of each set extending axially beyond their respective inner race ways into the path of movement of the other set and the heads of each set of rollers contacting with the outer race way of the other set at two points equally and substantially removed from the outermost point of each roller, rollers of one set contacting with those of the other set at points removed from their respective heads a distance substantially equal to the largest radius of the rollers.

3. A roller bearing comprising inner and outer relatively rotatable members each having two conical race ways therein, those on one member being opposed to those on the other member, conical rollers between said opposed race ways, the larger end of the rollers of each set extending axially beyond their respective inner race ways into the path of movement of the other set and shoulders set back at an angle from the outer race way of each set forming thrust contacts for the heads of the opposite set of rollers.

4. A roller bearing comprising inner and outer relatively rotatable members each having two conical race ways therein, those on one member being opposed to those on the other member, conical rollers between said opposed race ways, hyperbolic sections between the ends of said rollers, the hyperbolic sections of one set interfingering with and contacting those of the other set.

5. A roller bearing comprising inner and outer relatively rotatable members each having two conical race ways therein, those on one member being opposed to those on the other member, conical rollers between said opposed race ways, the larger end of the rollers of each set extending axially beyond their respective inner race ways into the path of movement of the other set and rollers of one set contacting with those of the other set at points removed from their respective heads a distance substantially equal to the largest radius of the rollers, shoulders set back at an angle from the outer race way of each set forming thrust contacts for the heads of the opposite set of rollers.

6. A roller bearing comprising inner and outer relatively rotatable members each having two conical race ways therein, those on one member being opposed to those on the other member, conical rollers between said opposed race ways, hyperbolic sections between the ends of said rollers, the hyperbolic sections of one set interfingering with and contacting those of the other set and shoulders on the outer race way of each set forming thrust contacts for the heads of the opposite set of rollers.

7. A roller bearing comprising inner and outer relatively rotatable members each having two conical race ways therein, those on one member being opposed to those on the other member, conical rollers between said opposed race ways, hyperbolic sections between the ends of said rollers, the hyperbolic sections of one set interfingering with and contacting those of the other set and the heads of each set of rollers contacting with the outer race way of the other set at two points equally and substantially removed from the outermost point of each roller.

8. A double row roller bearing comprising an inner bearing member having reversely tapered raceways, a circular series of tapered rollers on each raceway, the rollers of the two series alternating and having portions overlapping at the middle of the bearing far enough that a portion of the end of each roller projects radially beyond adjacent rollers and a bearing cup for each series of rollers, the ends of the rollers of each series abutting against the end of the cup for the rollers of the other series.

9. A double row taper roller bearing comprising an inner bearing member having two raceway portions tapering toward the end of said inner bearing member, a circular series of tapered rollers on each raceway, the rollers of the two series alternating and having portions overlapping at the middle of the bearing far enough that a portion of the end of each roller projects radially beyond adjacent rollers, and a bearing cup for each series of rollers, the opposed faces of said bearing cups having portions each arranged to engage the ends of the rollers projecting from the raceway of the other cup.

10. A double row roller bearing comprising an inner bearing member having reversely tapered raceways, a circular series of tapered rollers on each raceway, the rollers of the two series alternating and having portions overlapping at the the middle of the bearing and a bearing cup for each series of rollers, each cup having an angularly disposed end face and the ends of the rollers of each series abutting against said angularly disposed face of the cup for the rollers of the other series so as to have self-alining contact therewith.

11. A double row taper roller bearing comprising an inner bearing member having two raceway portions tapering toward the end of said inner bearing member, a circular series of tapered rollers on each raceway, the rollers of the two series alternating and having portions overlapping at the middle of the bearing far enough that a portion of the end of each roller projects radially beyond adjacent rollers, and a bearing cup for each series of rollers, the opposed faces of said bearing cups having obliquely disposed portions, said rollers each having a flat end portion and said oblique portions of said cup faces being disposed at a re-entrant angle with respect to said flat faces, whereby each oblique cup face makes two point contact with rollers projecting from the raceway of the other cup and abutting against said oblique face.

12. A double row taper roller bearing comprising an inner bearing member having two raceway portions tapering towards the end of said inner bearing member, a circular series of tapered rollers on each raceway, the rollers of the two series alternating and having portions overlapping at the middle of the bearing far enough that a portion of the end of each roller projects radially beyond adjacent rollers, and a bearing cup for each series of rollers, the opposed faces of said bearing cups having flat annular portions around their outer periphery disposed normally to the axis of the bearing and having oblique portions disposed radially inward of said normal portions, said rollers each having a flat end portion and said oblique portions of said cup faces being disposed at a re-entrant angle with respect to said flat faces, whereby each oblique cup face makes two point contact with rollers projecting from the raceway of the other cup and abutting against said oblique face.

WILLIAM E. HOKE.